Oct. 7, 1941.  L. M. JOHNSON  2,258,058
LADLE
Filed Sept. 27, 1939
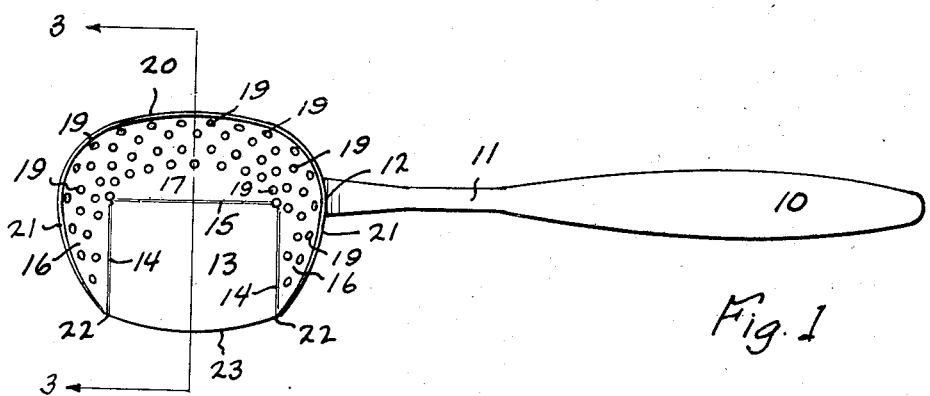
Fig. 1
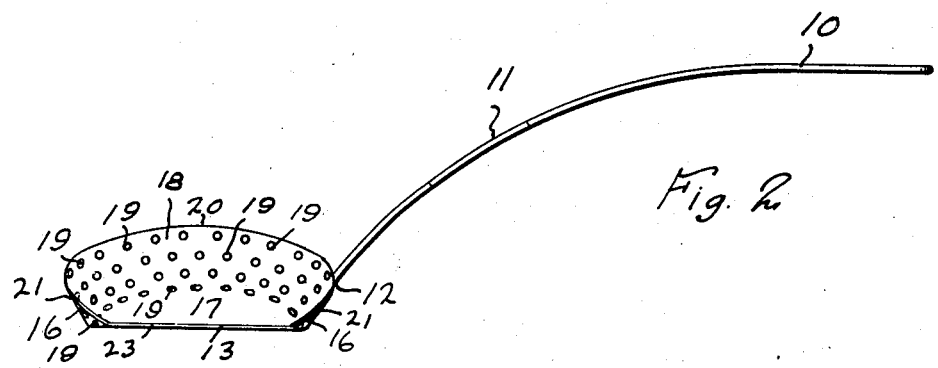
Fig. 2
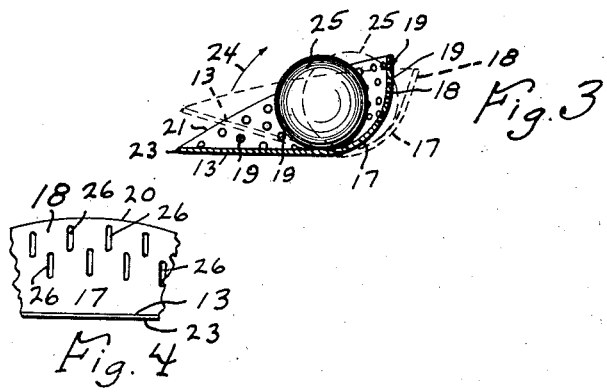
Fig. 3
Fig. 5
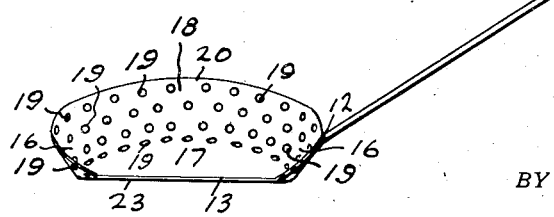
Fig. 4
INVENTOR.
Lena M. Johnson
Sam J. Slotsky
ATTORNEY.

Patented Oct. 7, 1941

2,258,058

UNITED STATES PATENT OFFICE 2,258,058

LADLE

Lena M. Johnson, Sioux City, Iowa

Application September 27, 1939, Serial No. 296,727

2 Claims. (Cl. 65—28)

My invention relates to a ladling device.

An object of my invention is to provide a ladling device which besides being adaptable for various purposes can be used specifically for elevating of poached eggs and removing the same from water.

A further object of my invention is to provide a ladle which includes features allowing convenient reception of the egg or similar product on to a horizontal platform which is an integral portion of the device and then suitable means for allowing transference of the egg to a further receiving portion, and to provide drainage features together with the ladle.

A further object of my invention is to provide a suitable handle member properly positioned with respect to the ladling portions of the device so that the operation can be performed in a simple manner.

A further object of my invention is to provide the above mentioned objects in a very simple construction which can be made from simple stampings or the like.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of the ladle,

Figure 2 is a side elevation,

Figure 3 is a sectional view taken along the lines 3—3 of Figures 1,

Figure 4 is a modification, and

Figure 5 is a modification showing a straight handle.

I have used the character 10 to designate generally the handle of my ladle which handle curves downwardly into the substantially arcuate portion 11 and terminates in the portion 12 which is attached to the conveying portion of the arrangement. The ladle cup or spoon itself comprises a flat horizontal portion 13 which is flat throughout and which is bordered by the side edges 14 and the rear edges 15.

Continuing from the side edges 14 are the upwardly extending side walls 16 which can be slightly arcuate or straight as desired and continuing from the edges 15 and extending upwardly is the arcuate portion 17 (see Figures 1, 2 and 3). It will be noted that the arcuate portion 17 merges with the portion 13 and extends into a further vertical portion 18 which includes a series of perforations 19. The perforations 19 extend partially into the portion 17 but not all of the way down as shown in the figures and the perforations 19 also are formed within the side walls 16. The upper edges of the walls 18 and the walls 16 are bounded by the top edges 20 and 21.

The edges 21 terminate at 22 and extend downwardly where they join the terminations of the side edges 14. The ladle is used as follows:

The forward edge 23 of the flat portion 13 can be bevelled slightly as shown and this edge is first placed beneath the poached egg and is then moved forwardly. This will cause the egg to roll or move along the flat portion 13 and the ladle is then tipped in the direction of the arrow 24 to the dotted position as shown in Figure 3 which causes the egg 25 to be received within the arcuate portion 17. The egg is then lifted from the hot water surrounding the same and the water will drain through the holes 19 back into the receptacle thereby freeing the ladle of any liquid contents.

The ladle is then conveyed to the necessary plate where it is desired to place the egg and it can then be brought back to the horizontal position allowing the poached egg to roll back upon the plate. It will be noted that the combination of the flat portion 13 and the arcuate portion 17 together with the rear retaining wall 18 forms a desirable combination in that the poached egg which is in a softened state can be suitably gathered and elevated without breaking the same.

The side walls 16 assist in retaining the egg or such article also against lateral movement. The ladle, if desired, can be used without the holes 19 and still incorporate the same features, the openings, however, forming a preferred construction.

An important feature of my invention is the provision of the arcuate forward edge 23 which allows gathering of the egg or similar product in an efficient manner since the curve 23 will in most cases substantially fit the curvature of the containing pan or other vessel in which the egg is placed. For instance, if the edge 23 were a straight line and not curved as shown, it would be difficult to gather up the egg especially on smaller vessels since the opening between the vessel and the points 22 of the device would leave a larger gap or opening making it relatively difficult to bring the edible on to the ladle.

The arcuate edge 23, however, allows the ladle to be slipped under the egg and brought snugly to the curvature of the vessel thereby insuring that the egg will roll on to the flat portion thereof.

Figure 4 illustrates a modification wherein the openings are supplied in the form of lengthened slots 26 which are staggered as shown to provide rigidity to the portion 18 and at the same time allowing drainage features. The slots 26 are made narrow to prevent the possible passage of any solid matter.

Figure 5 illustrates a modification wherein the handle 27 is straight and bent angularly to the desired height. It will be noted that the handles 10 and 27 are so formed as to allow grasping of the upper handle portion at a remote distance and yet allowing the flat portion 13 to rest upon the base of the pan or other container containing the egg or other product.

It will be specifically understood that poached eggs or boiled eggs or other edibles can be also ladled with this device, such as fried eggs, etc.

It will now be seen that I have provided a ladling device which can be used for various ladling purposes, which allows for the ladling of soft products such as poached eggs, which includes a horizontal platform member merging with a receiving arcuate member, which includes drainage features, which allows the ladling operation to be performed in a simple manner and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A ladle comprising an egg or other product receiving member, said receiving member including a horizontal flat member for rolling said egg thereon, a handle attached to said receiving member and laterally therefrom allowing remote manipulation therefrom, said receiving member including an arcuate portion merging with said flat portion for receiving an egg after tilting of the receiving member, a rear wall merging with said arcuate portion, said rear wall and said arcuate portion having a plurality of openings to cause drainage of liquid therethrough, further side walls merging from said arcuate portion and said rear wall and extending forwardly to the forward edges of said flat portion.

2. A ladle comprising an egg or other product receiving member, said receiving member including a horizontal flat member for rolling said egg thereon, a handle attached to said receiving member and laterally therefrom allowing remote manipulation therefrom, said receiving member including an arcuate portion merging with said flat portion for receiving an egg after tilting of the receiving member, a rear wall merging with said arcuate portion, said rear wall and said arcuate portion having a plurality of openings to cause drainage of liquid therethrough, said horizontal flat member including a forward arcuate edge adapted to substantially coincide with the curvature of a receiving vessel.

LENA M. JOHNSON.